(12) United States Patent
Yu

(10) Patent No.: US 7,431,490 B2
(45) Date of Patent: Oct. 7, 2008

(54) LIGHT GUIDE PLATE AND BACKLIGHT MODULE ADOPTING THE SAME

(75) Inventor: Tai-Cherng Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 200 days.

(21) Appl. No.: 11/404,520

(22) Filed: Apr. 14, 2006

(65) Prior Publication Data
US 2006/0239029 A1   Oct. 26, 2006

(30) Foreign Application Priority Data
Apr. 22, 2005   (TW) .................................. 094113028

(51) Int. Cl.
*F21V 33/00* (2006.01)
*F21V 5/00* (2006.01)
(52) U.S. Cl. ........................................ 362/606; 362/331
(58) Field of Classification Search ....................... None
See application file for complete search history.

(56) References Cited

U.S. PATENT DOCUMENTS

2001/0053075 A1 * 12/2001 Parker et al. .................. 362/31
2003/0174491 A1 * 9/2003 Ohizumi et al. ............... 362/31

FOREIGN PATENT DOCUMENTS

| CN | 1571903 A | | 1/2005 |
|---|---|---|---|
| JP | 2001143512 | * | 5/2001 |
| TW | I226956 B | | 8/2003 |
| TW | 200500570 | | 1/2005 |
| TW | 200502598 | | 1/2005 |

* cited by examiner

*Primary Examiner*—Ali Alavi
(74) *Attorney, Agent, or Firm*—Andrew C. Cheng

(57) ABSTRACT

A light guide plate (200) includes an emission surface (204), a bottom surface (206), and at least one chamfering (202). The emission surface intersects with the chamfering. The bottom surface intersects with the chamfering and is opposite to the emission surface. The light guide plate further includes a plurality of prism structures (208) formed at least one of within and on at least one of the emission surface and the bottom surface. A backlight module (50), adopting the above-mentioned light guide plate, further includes a corresponding light source (220) positioned beside each chamfering of the light guide plate.

15 Claims, 5 Drawing Sheets

(PIROR ART)

LIGHT GUIDE PLATE AND BACKLIGHT MODULE ADOPTING THE SAME

BACKGROUND

1. Field of the Invention

The invention relates generally to light guide plates for liquid crystal displays (i.e., LCD's) and backlight modules adopting the same and, more particularly, to a light guide plate employing prism elements and a backlight module adopting the same.

2. Discussion of Related Art

Liquid crystal display devices have many excellent performance characteristics, such as large-scale information display ability, easily colored, low power consumption, long life, no pollution associated therewith, and so on. Therefore, liquid crystal display devices are used widely A typical liquid crystal display device generally includes a backlight module, and the backlight module is used to convert linear light sources, such as cold cathode ray tubes, or point light sources, such as light emitting diodes, into area light sources having high uniformity and brightness.

Referring to FIG. 9, a conventional backlight module 10 includes a light guide plate 100, a light source 120 and a prism sheet 900. The light guide plate 100 includes an emission surface 104, a bottom surface 106 and a chamfering 102. The emission surface 104 intersects with the chamfering 102. The bottom surface 106 intersects with the chamfering 102 and is opposite to the emission surface 104. The light source 120 is positioned beside the chamfering 102 of the light guide plate 100. The light source 120 generally is a light emitting diode (LED). The prism sheet 900 is situated upon the emission surface 104 of the light guide plate 100. The prism sheet 900 generally includes a plurality of prisms 902. The prisms 902 are substantially parallel to each other. Each prism 902 is strip-shaped, and a section thereof is a triangle.

In use, incident light beams are emitted from the light source 120 and are transmitted into the light guide plate 100 via the chamfering 102. The light guide plate 100 is used to direct travel of the incident light beams therein and ensure that most of the incident light beams can be emitted from the emission surface 104 thereof The prism sheet 900 can converge the emitted light beams. This convergence helps ensure that the emitted light beams have good uniformity and brightness.

However, a cost of the additional prism sheet 900 is relatively high. This factor increases the manufacturing cost of the backlight module 10. Furthermore, the prism sheet 900 can't adjust the uniformity and brightness of the emitted light beams when the light source 120 is changed.

What is needed, therefore, is a light guide plate which can converge the emitted light beams, according to a potential change in the light source, and which is more economical than the prior combination of a prism sheet and a light guide plate.

What is also needed is a backlight module, adopting the above-mentioned light guide plate.

SUMMARY

In one embodiment, a light guide plate includes an emission surface, a bottom surface, and at least one chamfering. The emission surface intersects with the chamfering. The bottom surface intersects with the chamfering and is opposite to the emission surface. The light guide plate further includes a plurality of prism structures formed at least one of on and in at least one of the emission surface and the bottom surface.

In another embodiment, a backlight module includes the above-described light guide plate and a light source. The light source is positioned beside the chamfering of the light guide plate.

Other advantages and novel features of the present light guide plate and the backlight module adopting the same will become more apparent from the following detailed description of preferred embodiments when taken in conjunction with the accompanying drawings.

BRIEF DESCRIPTION OF THE DRAWINGS

Many aspects of the present light guide plate and the related backlight module can be better understood with reference to the following drawings. The components in the drawings are not necessarily to scale, the emphasis instead being placed upon clearly illustrating the principles of the present light guide plate and the related backlight module.

Figure 1:
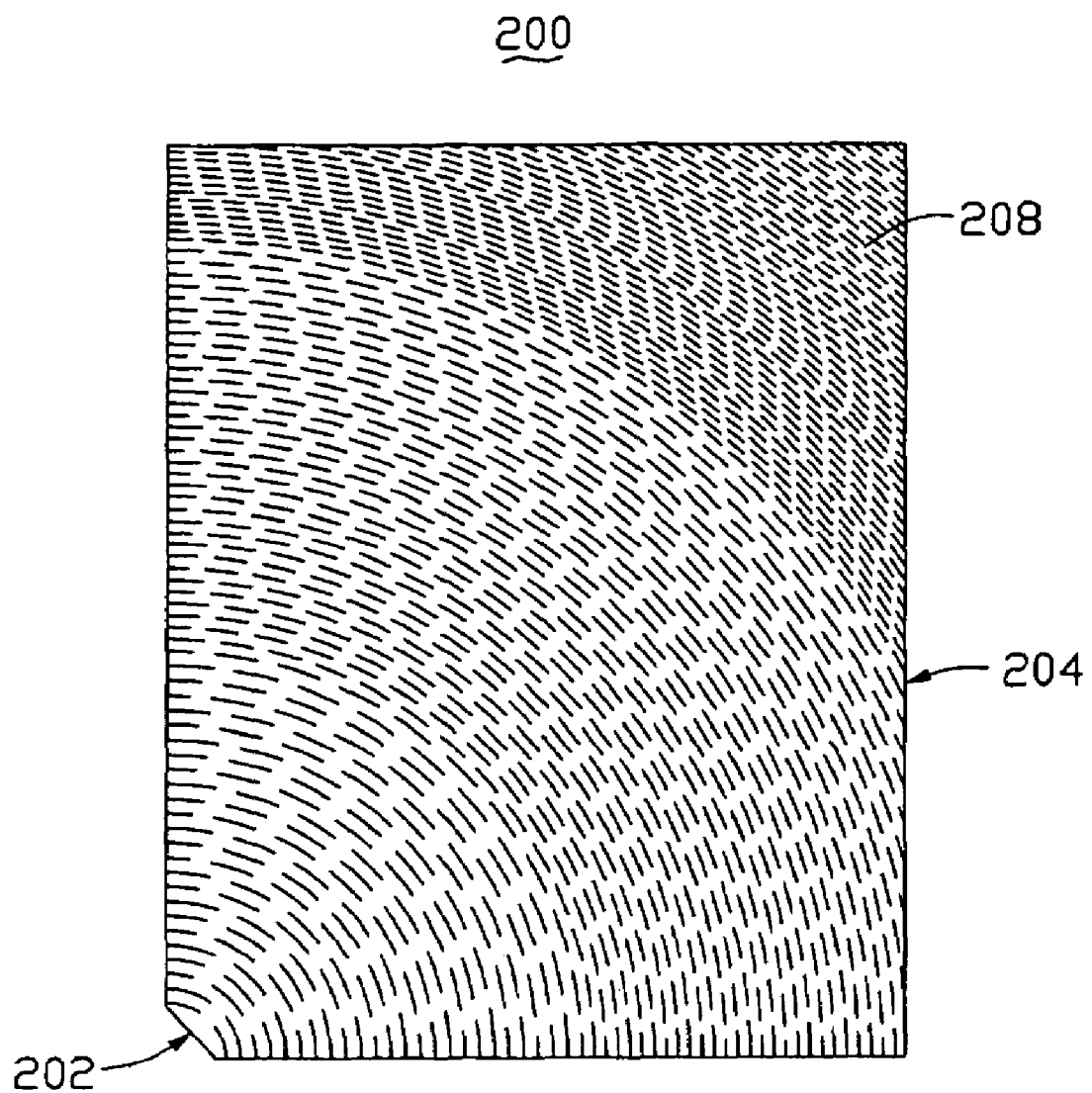
FIG. 1 is a schematic, top view of a light guide plate, in accordance with a first exemplary embodiment of the present device.

Corresponding reference characters indicate corresponding parts throughout the several views. The exemplifications set out herein illustrate at least one preferred embodiment of the present light guide plate and the related backlight module, in one form, and such exemplifications are not to be construed as limiting the scope of the invention in any manner.

DETAILED DESCRIPTION OF PREFERRED EMBODIMENTS

Reference will now be made to the drawings to describe embodiments of the present light guide plate and the related backlight module, in detail.

Figure 2:
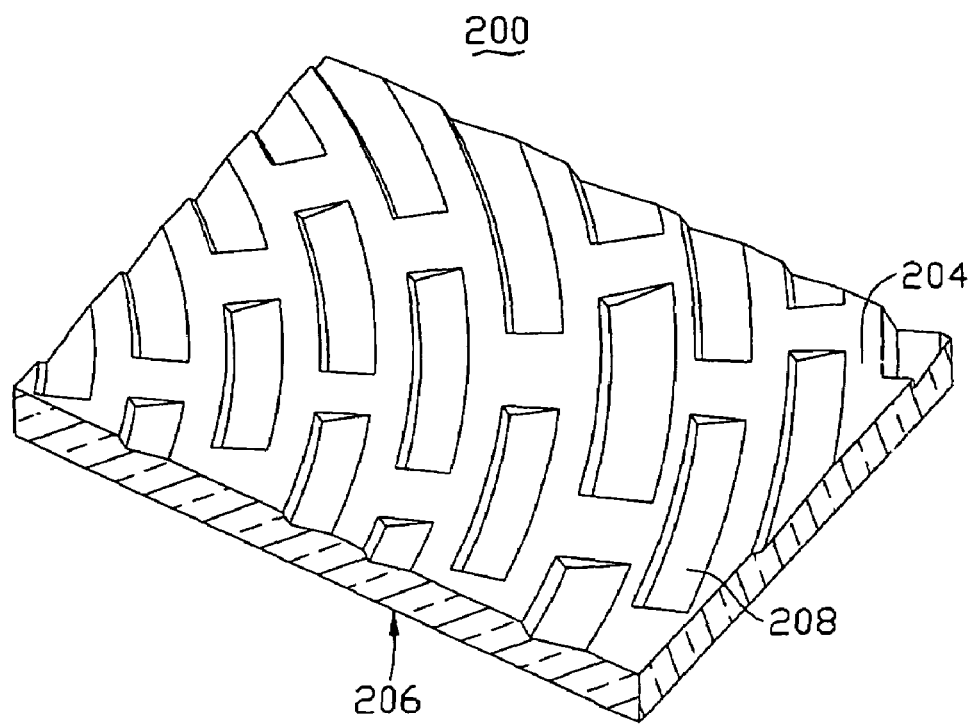
FIG. 2 is an isometric, partly enlarged view of the light guide plate of FIG. 1.

FIG. 1 is a schematic, top view of a light guide plate 200, in accordance with a first exemplary embodiment of the present device, and FIG. 2 is an isometric, partly enlarged view of a section of the light guide plate 200 of FIG. 1. Referring to FIGS. 1 and 2, the light guide plate 200 includes an emission surface 204, a bottom surface 206, and a chamfering/chamfer 202. The emission surface 204 intersects with the chamfering 202. The bottom surface 206, likewise, intersects with the chamfering 202 and is opposite to the emission surface 204. The light guide plate 200 further includes a plurality of prism structures 208 formed on and/or within the emission surface 204 thereof The prism structures 208 are discontinuously disposed on the emission surface 204. The prism structures 208 are homocentric and distributed substantially in a series of arcs. The chamfering 202 acts as a center of the arcs associated with the prism structures 208. The bottom surface 206, in this embodiment, is generally flat.

Figure 3:
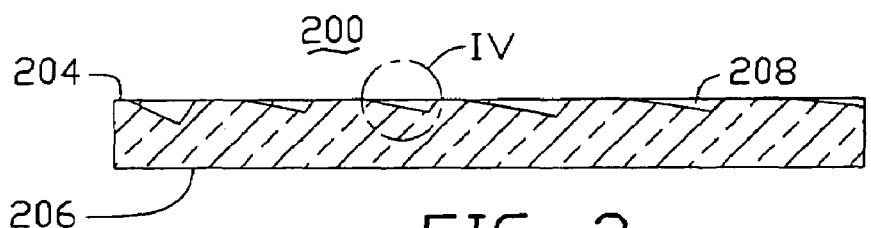
FIG. 3 is a schematic, side view of the light guide plate of FIG. 1.
Figure 4:
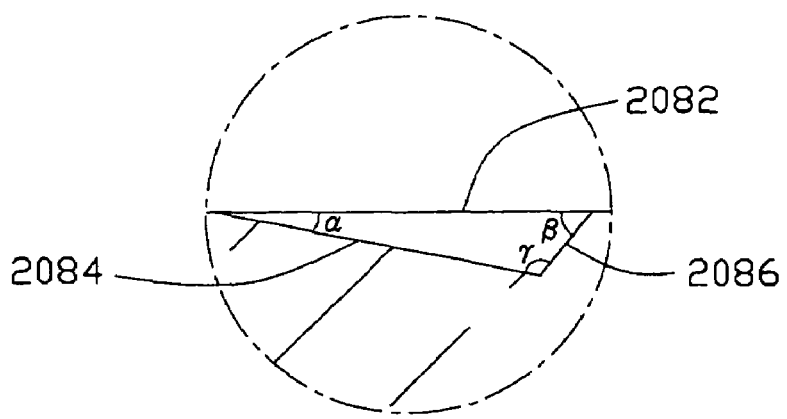
FIG. 4 is a schematic, enlarged view of the portion IV in FIG. 3.

FIG. 3 is a schematic, side view of a portion of the light guide plate 200 of FIG. 1. As shown in FIG. 3, the prism structures 208 are concave structures in the emission surface 204. A concave section or notch associated with each prism structure 208 is a triangular in cross-section. FIG. 4 is a schematic, enlarged view of the portion IV in FIG. 3. As shown in FIG. 4, the triangular notch is bounded by a first wall 2082, a second wall 2084 and a third wall 2086. The second wall 2084 and the third wall 2086 cooperatively define an apex angle γ, the first wall 2082 and the third wall 2086 cooperatively define a first base angle β and the first wall 2082 and the second wall 2084 cooperatively define a second base angle α. The apex angle of the triangle is generally an obtuse angle. The first base angle β of the triangle is substantially four times as big as the second base angle α thereof.

Figure 5:
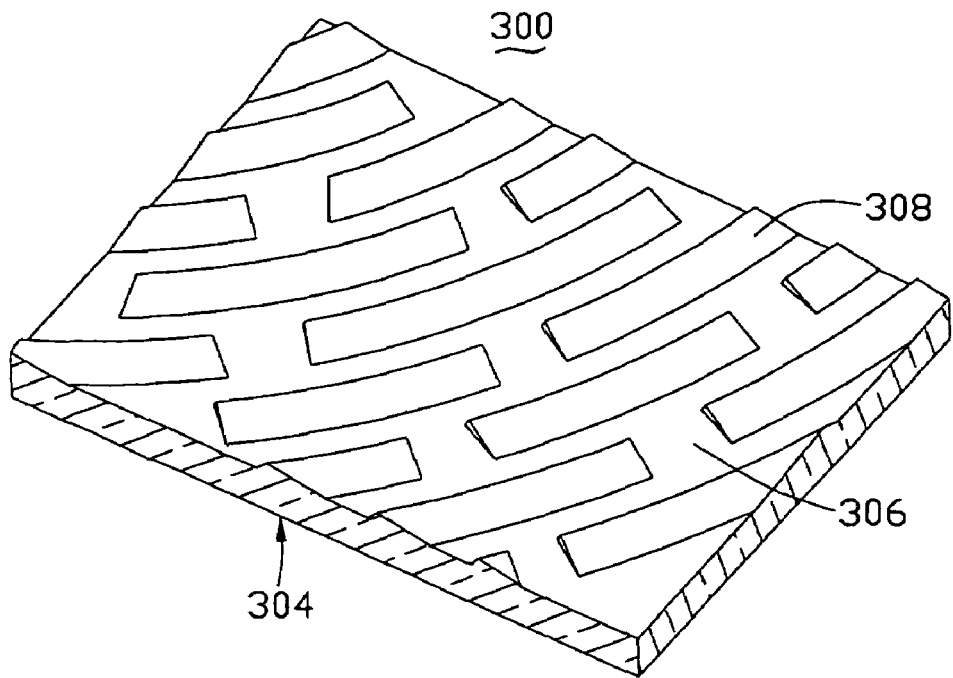
FIG. 5 is an isometric, partly enlarged view of a light guide plate, in accordance with a second exemplary embodiment of the present device.

FIG. 5 is an isometric, partly enlarged view of a light guide plate 300, in accordance with a second exemplary embodiment of the present device. As shown in FIG. 5, the light guide plate 300 is similar to the above-described light guide plate 200, except that the prism structures 308 thereof are convex structures and are formed on a bottom surface 306 thereof Furthermore, an emission surface 304 thereof is generally flat.

Figure 6:
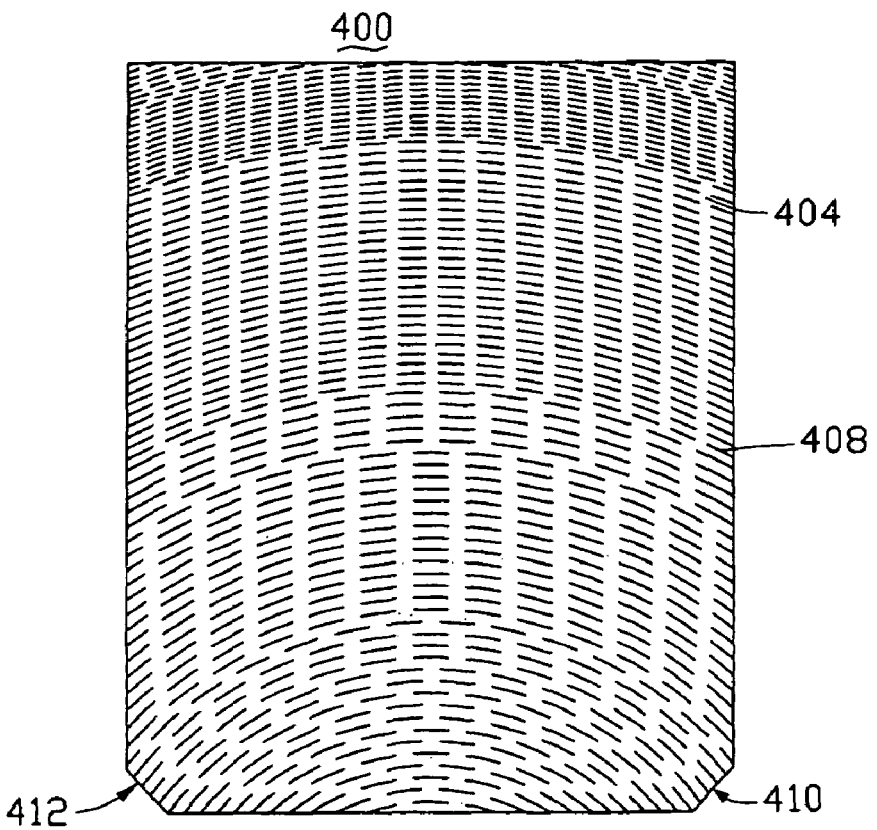
FIG. 6 is a schematic, top view of a light guide plate, in accordance with a third exemplary embodiment of the present device.

FIG. 6 is a schematic, top view of a light guide plate 400, in accordance with a third exemplary embodiment of the present device. As shown in FIG. 6, the light guide plate 400 is similar to the above-described light guide plate 200, except that that the light guide plate includes a pair of adjacent chamferings 410, 412. The two adjacent chamferings 410, 412 intersect with an emission surface 404 and a bottom surface (not labeled), respectively, of the light guide plate 400. Prism structures 408 are formed on the emission surface 404. The prism structures 408 are homocentric and distributed substantially in a plurality of arcs. A midpoint of the two adjacent chamferings 410, 412 is as a center of the arcs defined by the prism structures 408.

It is to be understood that the prism structures 208 of the light guide plate 200, the prism structures 308 of the light guide plate 300, and the prism structure 408 of the light guide plate 400 can be distributed as in a plurality of correspondingly-shaped curves, including an elliptical curve or a parabolic curve, as alternatives to arcuate. Furthermore, the centers of the prism structure 208, 308, 408 can be varied according to actual needs (i.e., uniformity and brightness of emitted light beams). Such variations in the curvatures and/or centers of the prism structures are considered to be within the scope of the present device. It is also to be understood that the prism structures 208, 308, 408 could instead be defined in terms of the remaining surface structure of the light guide plates 200, 300, 400, as opposed to the concavities or convexities associated therewith.

Figure 7:
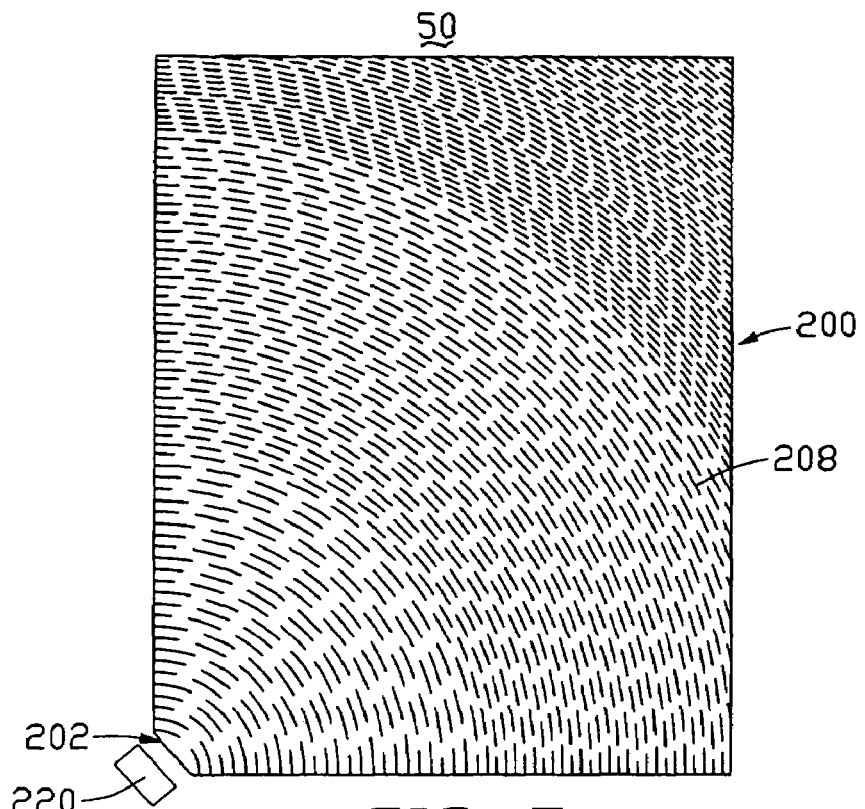
FIG. 7 is a schematic, top view of a backlight module adopting the light guide plate of FIG. 1.

FIG. 7 is a schematic, top view of a backlight module 50, adopting the light guide plate 200 of FIG. 1. As shown in FIG. 7, the backlight module 50 includes a light source 220 and the above-described light guide plate 200. The light source 220 is disposed beside the chamfering 202. The light source 220 is generally a light emitting diode (LED) or another point light source. In use, incident light beams are emitted from the light source 220 and are transmitted into the light guide plate 200 via the chamfering 202. The light guide plate 200 directs travel of the incident light beams therein and ensures that most of the incident light beams can be emitted from the emission surface 204 thereof The prism structures 208 can converge the emitted light beams. This convergence enhances the uniformity and brightness of the emitted light beams. Therefore, the backlight module 50, adopting the light guide plate 200, has a satisfactory display quality and can be advantageously applied in liquid crystal display devices.

Figure 8:
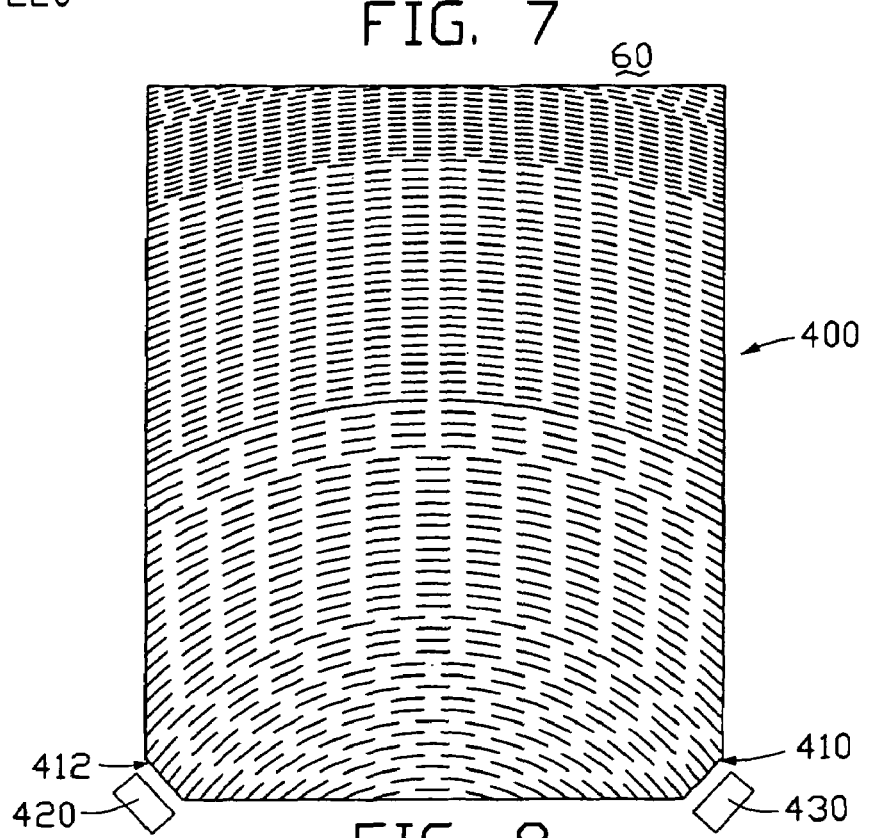
FIG. 8 is a schematic, top view of a backlight module adopting the light guide plate of FIG. 6.
Figure 9:
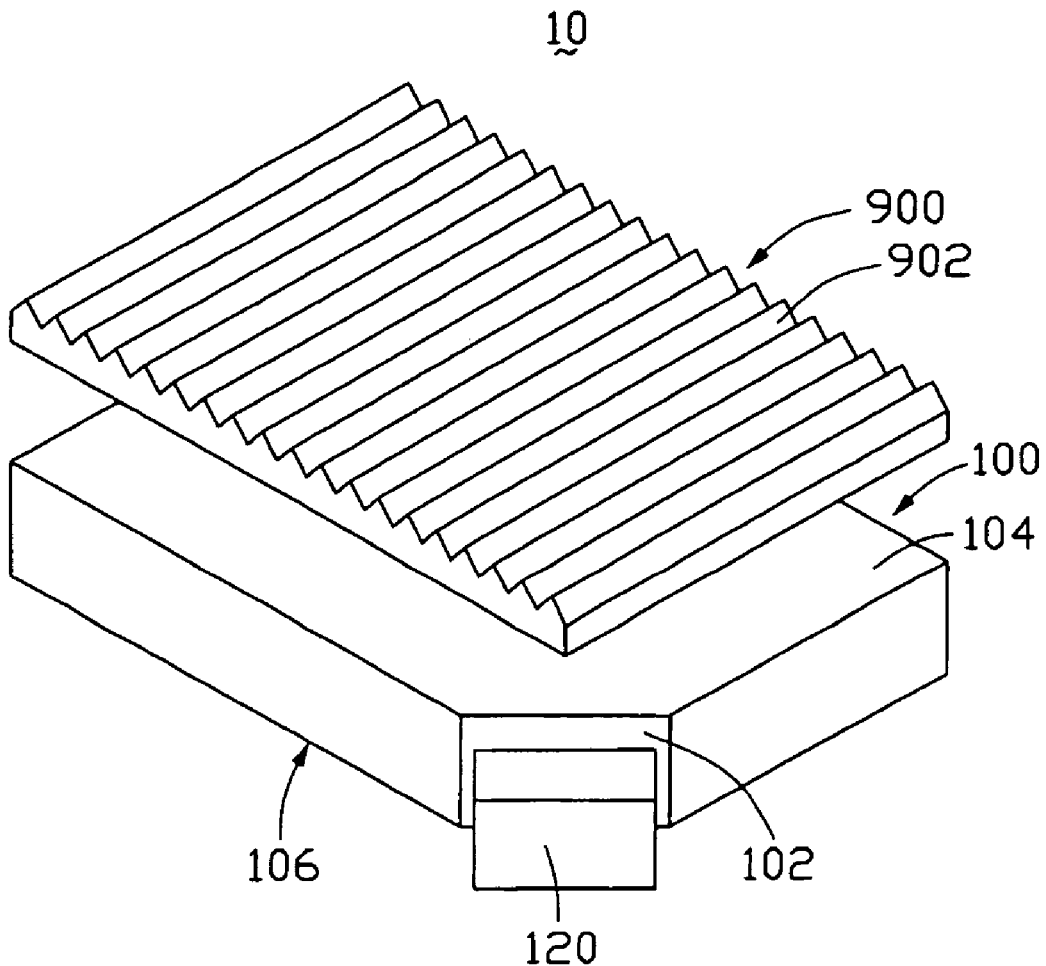
FIG. 9 is an isometric view of a conventional backlight module.

FIG. 8 is a schematic, top view of a backlight module 60, adopting the light guide plate 400 of FIG. 6. As shown in FIG. 8, the backlight module 60 includes a pair of light source 420, 430 and the above-described light guide plate 400. The light sources 420, 430 are disposed beside the chamferings 412, 410, respectively. The light sources 420, 430 are generally light emitting diodes (LEDs) or another point light source. In use, incident light beams are emitted from the light source 420, 430 and are transmitted into the light guide plate 400 via the chamferings 412, 410. The light guide plate 400 directs travel of the incident light beams therein and ensures that most of the incident light beams can be emitted from the emission surface 404 thereof The prism structures 408 can converge the emitted light beams. This convergence enhances the uniformity and brightness of the emitted light beams. Therefore, the backlight module 60, adopting the light guide plate 400, has a satisfactory display quality and can be advantageously applied in liquid crystal display devices.

Compared with the conventional light guide plate and the related backlight module, the present light guide plate of the present backlight module includes the prism structures. The prism structures are a part of the present light guide plate and has a converging function similar to the prism sheet of the conventional backlight module. Therefore, the present backlight module doesn't need an additional prism sheet as the conventional light guide plate does. This decreases a manufacturing cost of the present backlight module, as the prism structures are concurrently formed in the process of molding the light guide plate (i.e., the plate mold includes the prism structures therein). Furthermore, the distribution of the prism structures of the present light guide plate can be varied according to actual needs (i.e., uniformity and brightness of the emitted light beams). Therefore, the backlight module can adjust the uniformity and brightness of the emitted light beams when the light sources are changed.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. A light guide plate comprising:
   an emission surface;
   a bottom surface, the bottom surface and the emission surface being at opposite sides of the light guide plate;
   at least one chamfering intersecting with the emission surface and the bottom surface; and
   a plurality of prism structures formed at least one of within and on at least one of the emission surface and the bottom surface, a section associated with each prism structure being a triangle including an apex angle, a first base angle, and a second base angle, the apex angle being an obtuse angle and the first base angle being substantially four times as large as the second base angle.

2. The light guide plate as claimed in claim 1, wherein the triangle of a given prism structure corresponds to a concavity or convexity within the at least one of the emission surface and the bottom surface.

3. The light guide plate as claimed in claim 1, wherein the prism structures are discontinuously disposed on at least one of the emission surface and the bottom surface.

4. The light guide plate as claimed in claim 1, wherein the prism structures are homocentric.

5. The light guide plate as claimed in claim 4, wherein the light guide plate includes one chamfering, the chamfering being a center of the prism structures.

6. The light guide plate as claimed in claim 4, wherein the light guide plate includes two chamferings, a midpoint therebetween being a center of the prism structures.

7. The light guide plate as claimed in claim 4, wherein the prism structures are distributed in a plurality of correspondingly-shaped curves.

8. The light guide plate as claimed in claim 7, wherein the prism structures are arcuate in shape.

9. A backlight module comprising:
at least one light source; and
a light guide plate comprising:
an emission surface;
a bottom surface, the bottom surface and the emission surface being at opposite sides of the light guide plate;
at least one chamfering intersecting with the emission surface and the bottom surface; and
a plurality of prism structures formed at least one of within and on at least one of the emission surface and the bottom surface, a section associated with each prism structure being a triangle including an apex angle, a first base angle, and a second base angle, the apex angle being an obtuse angle and the first base angle being substantially four times as large as the second base angle.

10. The backlight module as claimed in claim 9, wherein the light source is disposed beside the chamfering.

11. The backlight module as claimed in claim 9, wherein the prism structures are discontinuously disposed on at least one of the emission surface and the bottom surface.

12. The backlight module as claimed in claim 9, wherein the prism structures are homocentric.

13. The backlight module as claimed in claim 12, wherein the backlight module includes one chamfering, the chamfering being a center of the prism structures.

14. The backlight module as claimed in claim 12, wherein the backlight module includes two chamferings, a midpoint therebetween being a center of the prism structures.

15. The backlight module as claimed in claim 12, wherein the prism structures are distributed in a plurality of correspondingly-shaped curves.

* * * * *